United States Patent [19]

Mochizuki et al.

[11] Patent Number: 4,760,012
[45] Date of Patent: Jul. 26, 1988

[54] SIGNAL RECORDING DISK

[75] Inventors: Hideaki Mochizuki, Higashiosaka; Tooru Tamura, Ikeda, both of Japan

[73] Assignee: Matsushita Electric Industrial Co., Ltd., Osaka, Japan

[21] Appl. No.: 91,349

[22] Filed: Aug. 28, 1987

Related U.S. Application Data

[63] Continuation of Ser. No. 880,318, Jun. 30, 1986, abandoned.

[30] Foreign Application Priority Data

Jul. 4, 1985 [JP] Japan ................................. 60-147539
Jul. 4, 1985 [JP] Japan ................................. 60-147549

[51] Int. Cl.$^4$ ...................... G11B 23/18; G01D 15/14
[52] U.S. Cl. ..................................... 430/273; 430/945; 428/65; 346/135.1; 346/137; 369/284; 369/286; 369/288
[58] Field of Search ........................... 428/416, 64, 65; 346/135.1, 137; 369/284, 288, 286; 430/945, 273

[56] References Cited

U.S. PATENT DOCUMENTS 4,410,581 10/1983 Nam ..................................... 428/210
4,503,531 3/1985 Kato ..................................... 428/497

Primary Examiner—Alexander S. Thomas
Attorney, Agent, or Firm—Wenderoth, Lind & Ponack

[57] ABSTRACT

A signal recording disk having an adhesive resin layer formed on a recording layer. The adhesive resin layer contains at least an epoxy group-containing compound, thereby preventing the recording layer from being degraded for a long period of time.

8 Claims, 1 Drawing Sheet

SIGNAL RECORDING DISK

This is a continuation of application Ser. No. 880,318, filed June 30, 1986 and now abandoned.

BACKGROUND OF THE INVENTION

1. Field of the Invention

This invention concerns a medium for recording and reproducing electric signals.

2. Description of the Prior Art

In recent years, large capacity external memories have become increasingly important with the increase in the amount of information. In addition to magnetic tapes and floppy discs existent so far, hard magnetic discs or optical discs have been highlighted as the external memory means. Among all, the optical discs are expected to play an important role as memory means in the future and vigorous studies have been made both for read-only discs and for rewritable discs.

The optical disc utilizing laser beams (hereinafter simply referred to as the optical disc) is a memory medium having such a great capacity that can store information of documents amounting to several tens of thousands of A-4 size sheets on a single disc with a diameter as small as 30 cm or less. Accordingly, each bit formed therein is as small as 1 μm in size. Further, since writing and reading of the information are performed by focusing the laser beam restricted to about 1 μm diameter on the disc rotating at a high speed under positional detection and focal adjustment, even extremely small scurs, obstacles, as well as deformations, warps and deviations in the substrate may cause signal errors. Therefore, the utmost care is required for the production of optical discs comparable to the same care required for the semiconductors. Further careful protecting structures have been adopted for most of the optical discs in order to improve the reliability. The protecting structures can generally be classified into two types, that is, a so-called air sandwich structure in which two disc sheets are appended with each other including an air layer therebetween and a closely bond structure in which adhesives are coated on the entire surface of a recording layer. Among them, the production steps are complicated, the thickness of the disc sheet is increased and the structure tends to be easily deformed in the former. While on the other hand, the latter close bond structure has no such drawbacks and the shape of the completed disc is stable. Example of the close bond type can include those in which discs of an identical shape are appended by using hot melt adhesives with the signal recording surfaces being on the inner side or in which a protecting layer of an acrylic lacquer is formed on a signal recording layer (Japanese Patent Application of Laid-Open No. 54-89704). The optical discs of these protecting structures are advantageous in view of their high productivity with a small amount of deformities in the disks, but their weatherproofness is not yet satisfactory. Those using the hot melt adhesives gradually lose the bonding strength, particularly, under high temperature and high humid conditions and the bonded portion may possibly be defoliated. The acrylic lacquer also lacks in the long time reliability in that the metallic recording layer rapidly causes remarkable corrosion aging, etc.

SUMMARY OF THE INVENTION

This invention intends to improve reliability of the signal recording disks over a long period of time and it is an object of the invention to provide a signal recording disk which exhibits a stable performance over a long period of time, even under high temperature and high humidity conditions.

For attaining the above object, in the signal recording disk according to this invention, a layer of an adhesive resin composition is formed on a metal-containing recording layer formed on a substrate and at least one epoxy-group containing compound is contained in the adhesive resin composition. It is necessary that the content of the epoxy group is at least 0.005 as the epoxy value. If the epoxy content is insufficient, stability under humid conditions is poor. When the disk is left under a high temperature and high humidity atmosphere, the adhesive resin layer and the plastic substrate absorbs water till it is saturated. Then, under a saturated hygroscopic state, metal ingredients in the recording film generally form local cells and are gradually oxidized. In the signal recording disk according to this invention, although the substrate and the adhesive resin layer are also saturated in a hygroscopic condition, since the epoxy compounds contained in the adhesive resin layer suppress the oxidization of metals under hygroscopic conditions, the reliability of the signal recording disk can be improved remarkably. It is preferred that the adhesive resin composition also contains an acrylic monomer, by which the curing can be attained in a shorter period of time. That is, the signal recording disk according to this invention can maintain its initial performances even after being used over a long period of time and also capable of being produced in a high mass.

DESCRIPTION OF PREFERRED EMBODIMENTS

This invention will now be explained more specifically, referring to the Examples.

Figure 1:
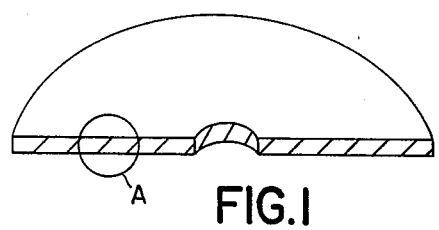
FIG. 1 is a perspective view of a signal recording disk in a cut-out state.

FIG. 1 shows a doughnut-like cut-out signal recording disk, in which an enlarged cross sectional portion A surrounded with a small circle is used for the explanation of the example. Description will be made referring to the optical discs in which the features of this invention are most clearly shown.

Figure 2:
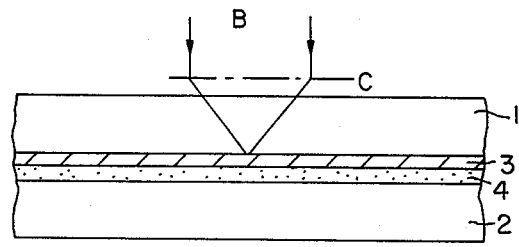
FIG. 2 is a cross sectional view of a single side recording/reproducing type optical disc.

FIG. 2 is a cross sectional view of a rewritable optical disc having a signal recording layer only on one side. That is, laser beam entered along the direction shown by the arrow B is converged at the area C via a collimate lens onto a recording layer 3 through a transparent substrate 1. The lens used in this embodiment has such a numerical aperture that restricts the spot diameter of the laser beam to about 1 μm.

Since the metal-containing recording layer 3 is easily contaminated in the exposed state, a protecting substrate 2 is appended by using an adhesive resin layer 4. In this case, the adhesive resin layer is prepared by dissolving a polymerization initiator and a viscosity controller into an acrylic monomer as the main ingredient, and coating an epoxy prepolymer - incorporated varnish solution, followed by curing. Short time curing is possible by selecting a compound capable of producing radicals in response to UV (ultraviolet)-rays as the polymerization initiator.

The adhesive resin layer 4 is cured by UV-rays permeating the transparent substrate 1. Development of corrosion under the high temperature and high humidity atmosphere is varied depending on the materials for the substrates 1 and 2 and corrosion occurs over the entire surface of the optical recording layer, if one of the substrates is moisture permeable. In the case where both of the substrates have no moisture permeability like glass, corrosion from the end of the bonded portion is observed. While an embodiment of using a transparent substrate made of a methacrylic resin is shown in the example for evaluating the observation of the corrosion under accelerated conditions, substrates made of polycarbonate resin, polyether imides, epoxy resin and glass can also be used actually in addition to the methacrylic resin substrate in this invention.

EXAMPLE 1

Adhesives, which had been prepared by dissolving 1 g of benzyldimethyl ketal and 20 g of a painting acrylic resin (Dianal BR-64, manufactured by Mitsubishi Rayon K.K.) in 100 g of a polyester type polyfunctional acrylate (Kayarad HX-220: trade name of products manufactured by Nippon Kayaku K.K.) and further dissolving 5 g of a bisphenol A type general purpose epoxy prepolymer having 180 to 200 epoxy equivalent, were used for appending a methacrylic resin substrate of 200 mm in diameter and 1.2 mm in thickness having a tellurium suboxide compound vapor deposited thereon to a thickness of 0.10 μm and a methacrylic resin substrate of an identical size, with the thickness of the adhesives being from 50 to 100 μm. Then, the two substrates were kept in parallel with each other and UV-rays were irradiated at 500 mJ/cm² to cure the adhesives and prepare an optical disc. The optical disc was left in a dry atmosphere at 80° C. or a high temperature and high humidity atmosphere at 70° C.—80% RH to observe the changes in the disc. The reduction in the C/N ratio and the change in the appearance of the disc after elapse of 200 hours are shown in Table 1.

EXAMPLE 2

By using adhesives, which had been prepared by dissolving 50 g of tetrahydrofulfryl acrylate in 50 g of a polyester type polyfunctional acrylate (Kayarad Manda: trade name of a product, manufactured by Nippon Kayaku K.K.), and further dissolving to mix 5 g of a bisphenol A type general-purpose epoxy prepolymer having from 450 to 500 epoxy equivalent, 20 g of a painting acrylic resin (Dianal BR-64, manufactured by Mitsubishi Rayon K.K.) and 1 g of benzyl dimethyl ketal, were used for bonding a methacrylic substrate of 200 mm in diameter and 1.2 mm in thickness and having a tellurium suboxide compound vapor deposited thereon to a thickness of 0.10 μm and another transparent methacrylic substrate of an identical shape under the same conditions to prepare optical discs. The performance of the optical discs is shown in Table 1.

EXAMPLE 3

Adhesives, which had been prepared by dissolving and mixing 70 g of a polyester polyfunctional acrylate (Kayarad Manda), 30 g of tetrahydrofulfryl acrylate, 5 g of a side chain type epoxy prepolymer having 310 to 340 epoxy equivalent (EP-4000, manufactured by Asahi Denka Kogyo K.K.) and further 20 g of a painting acrylic resin (Dianal BR-64) and 1 g of benzyl dimethyl ketal, were used for bonding a methacrylic resin substrate of 200 mm in diameter and 1.2 mm in thickness having tellurium suboxide compound vapor deposited thereon to a thickness of 0.1 μm and another transparent methacrylic substrate of an identical shape under the same conditions to prepare an optical disc. The performance is shown in Table 1.

EXAMPLE 4

Adhesives, which had been prepared by dissolving and mixing 70 g of a polyester polyfunctional acrylate (Kayarad Manda), 30 g of tetrahydrofulfryl acrylate, 10 g of bisphenol A type general-purpose epoxy resin having from 450 to 500 epoxy equivalent and further one g of benzyl dimethyl ketal were used to prepare optical discs under the same conditions and the same method as those in Example 1. The performance is shown in Table 1.

COMPARATIVE EXAMPLE 1

Adhesives were prepared by dissolving and mixing 100 g of a polyester type polyfunctional acrylate (Kayarad HX-220), 20 g of a painting acrylic resin (Dianal BR-64) and one g of benzyl dimethyl ketal, and optical discs were manufactured in accordance with the procedures in Example 1. The performance is shown in Table 1.

COMPARATIVE EXAMPLE 2

A methacryl resin substrate 200 mm in diameter and 12 mm in thickness having tellurium suboxide compound vapor deposited thereon to a 0.1 μm thickness and another methacrylic resin substrate of an identical shape were bonded by using commercial EVA type hot melt adhesives to prepare optical discs and the performance was evaluated. The result is shown in Table 1.

The optical discs according to this invention are a highly reliable, different from conventional cases, such that the they are free from fatal defects, that is, defoliation of the substrate and corrosion in the recording membrane even after the life test, as well as that the change in the C/N ratio is only within ±1 dB.

TABLE 1

| | Change in the characteristics after life test | | | |
| --- | --- | --- | --- | --- |
| | After 200 hr at 80° C. | | After 200 hr at 70° C. - 80% RH | |
| No. | C/N change (dB) | Appearance | C/N change (dB) | Appearance |
| Examples | | | | |
| 1 | −0.1 | no change | −0.3 | no change |
| 2 | −0.5 | no change | −0.8 | no change |
| 3 | +0.2 | no change | −0.6 | no change |
| 4 | −0.2 | no change | −0.8 | no change |
| Comparative examples | | | | |
| 1 | −0.5 | no change | measurement impossible | recording membrane become opaque |

TABLE 1-continued

| | Change in the characteristics after life test | | | |
|---|---|---|---|---|
| | After 200 hr at 80° C. | | After 200 hr at 70° C. - 80% RH | |
| No. | C/N change (dB) | Appearance | C/N change (dB) | Appearance |
| 2 | −6 | outer circumference defoliated | −10 | outer circumference defoliated |

Figure 3:
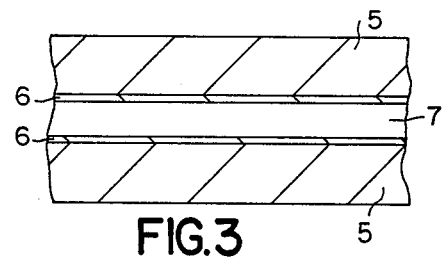
FIG. 3 is a cross sectional view of a both side recording/reproducing type optical disc and FIG. 4 is a cross sectional view of an optical disc used exclusively for reproduction.

Reference will now be made to the optical disc capable of recording and reproducing on both faces as the second embodiment. FIG. 3 shows a portion of the cross section, in which a pair of transparent substrates 5 are appended with each other by means of an adhesive layer 7 such that the respective recording layers 6 are situated on the inside. In this case, since light cannot reach the adhesives layer 7 being interrupted by the recording layers 6, heat curing is necessary.

EXAMPLE 5

To 70 g of

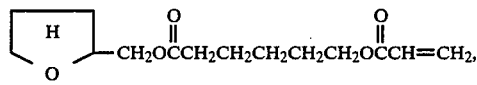

20 g of a painting acrylic resin, 10 g of tetrahydrofulfryl acrylate and 10 g of trimethylol propane triacrylate, were added with 2 g of a bisphenol A type epoxy prepolymer (epoxy equivalent 180, trade name: Epicoat 828) and further with 0.5 g of benzoyl peroxide and 0.02 g of dimethyl aniline separately, and dissolved. Two sheets of polycarbonate resin molding substrates having tellurium suboxide compound formed thereon as the recording layers were appended with each other. The adhesive was cured by heating at 70° C. for 30 minutes while opposing the two substrates not being displaced from each other. The discs were left at 70° C. under 80% RH and the performances after 200 hours were evaluated. The result is shown in Table 3. In the table, "BER" indicates the bit error rate that represents the number of errors generated for the written signals.

EXAMPLE 6

To 80 g of polyester polyfunctional acrylate Manda as described above, were dissolved 20 g of tetrahydrofulfryl acrylate, 10 g of diallyl phthalate prepolymer and 10 g of bisphenol A type epoxy prepolymer (epoxy equivalent 450–500, trade name Epicoat 1001, manufactured by Shell Chemical) and further 0.5 g of benzoyl peroxide and 0.02 g of dimethylaniline were added separately as the heat curing catalyst to prepare an adhesive. Then, polycarbonate resin molding substrates each of an identical shape having tellurium suboxide compounds formed thereon as the recording layers were bonded with each other and heated to cure at 70° C. for 30 minutes. The performance of the disc is shown in Table 2.

TABLE 2

| | Initial Performance | | Performance after 200 hour at 70° C. - 80% RH | | | |
|---|---|---|---|---|---|---|
| | C/N (dB) | BER | C/N (dB) | C/N (dB) change | BER | Appearance |
| Example 5 | 54.4 | $5 \times 10^{-5}$ | 54.2 | 0.2 | $5 \times 10^{-5}$ | no change |
| Example 6 | 55.1 | $6 \times 10^{-5}$ | 55.0 | 0.1 | $5 \times 10^{-5}$ | no change |

Figure 4:
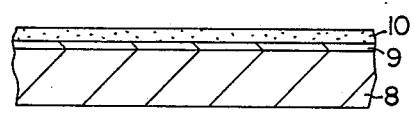

Desription will now be made to the read-only optical disc as the third embodiment. Different from the optical discs as described above, this optical disc cannot be used for recording but for only reproducing, since signals are formed already upon molding of the substrates. To the surface of a transparent substrate 8 containing previously formed signal bits, are formed a reflection layer 9 and, further thereover, an adhesive resin layer 10 for the protection of the reflection layer as shown in FIG. 4.

EXAMPLE 7

Aluminum was vapor deposited to a 40 nm thickness on a polycarbonate resin molding substrate having music signals as a row of bits formed on one surface. An adhesive resin composition described later was formed to a thickness of 5 μm from above the aluminum reflection layer for the aim of protection. The adhesive resin composition was prepared by dissolving 30 g of tetrahydrofulfryl acrylate, 10 g of bisphenol A type epoxy resin (epoxy equivalent: 450–500, trade name Epicoat 1001, manufactured by Shell Chemical) in 70 g of Manda as described above and further dissolving to mix 1 g of 2-hydroxy-2-methyl-1-phenylpropan-1-one as the photocuring catalyst. After spin-coating the adhesive, it was cured under the irradiation of UV-rays at 300 mJ/cm$^2$ in a nitrogen gas atmosphere. The performance of the disc is shown in Table 3. In the table, symbol error rate means the rate of error occurrence for one symbol constituted with 8 bits. For instance, symbol error rate $1 \times 10^{-3}$ means generation of one error per 1000 symbols.

EXAMPLE 8

An adhesive resin composition was prepared by mixing and dissolving 70 g of the acrylic monomer-HX-220 as described above, 30 g of a difunctional acrylic monomer shown below:

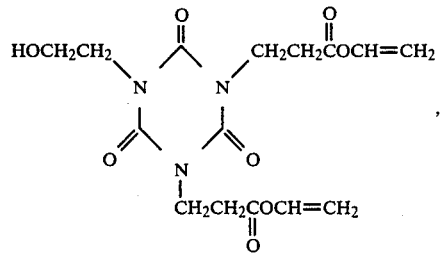

5 g of an epoxy prepolymer (epoxy equivalent 180, Epicoat 828) and 1 g of benzyl methyl ketal. The adhesive was coated to a thickness of 8 μm on an aluminum reflection layer on a polycarbonate substrate having a train of signal bits and then cured under the irradiation of UV-rays at 500 mJ/cm$^2$ in a nitrogen gas atmosphere. The performance of the disc is shown in Table 3.

COMPARATIVE EXAMPLE 3

The epoxy value in the adhesive resin composition of Example 7 is 0.018. An optical disc was prepared in the same procedures as in Example 7 excepting for using a composition in which the epoxy value was reduced to about 0.004 by changing the amount of the blended epoxy prepolymer to 2 g. The performance is shown in Table 3.

COMPARATIVE EXAMPLE 4

Commercial compact discs were tested and their performances are shown in Table 3.

In all of the examples, the stable performance under the high temperature and high humidity atmosphere is remarkable and the excellent weather proofness of the signal recording sheets according to this invention was demonstrated in comparison with the comparative examples.

TABLE 3

| No. | Symbol Error Rate | |
| --- | --- | --- |
| | Initial | After 100 hr at 70° C. - 80% RH |
| Example 7 | $5.4 \times 10^{-4}$ | $5.2 \times 10^{-4}$ |
| Example 8 | $4.3 \times 10^{-4}$ | $4.0 \times 10^{-4}$ |
| Comparative Example 3 | $5.1 \times 10^{-4}$ | less than $1 \times 10^{-1}$ |
| Comparative Example 4 | $5.5 \times 10^{-4}$ | $2 \times 10^{-2}$ |

What is claimed is:

1. A signal recording disk comprising a recording layer containing metal formed on a substrate, and an adhesive resin composition layer formed on said recording layer, said adhesive resin composition layer containing an acrylic monomer, a radical former and at least an epoxy group-containing compound wherein the epoxy value in said resin composition layer is at least 0.005, whereby said adhesive resin composition layer prevents said metal in said recording layer from being oxidized in a high temperature and high humidity atmosphere.

2. A signal recording disk as claimed in claim 1, wherein the radical former in the adhesive resin composition layer is decomposed under the irradiation of ultraviolet rays to form radical species thereby enabling the adhesive resin composition layer to be cured.

3. A signal recording disk as claimed in claim 1, wherein the adhesive resin composition layer can rapidly be cured under a relatively low temperature by the incorporation of a radical former composed of a peroxide in combination with an amine compound.

4. A signal recording disk as claimed in claim 1, wherein, a plastic substrate is used as the substrate.

5. A signal recording disk as claimed in claim 1, wherein the recording layer is a thin film of tellurium suboxide.

6. A signal recording disk as claimed in claim 1, wherein the recording layer comprises an aluminum film.

7. A signal recording disk comprising two transparent resin substrates each formed thereon a recording layer composed of a tellurium suboxide, and an adhesive resin layer for adhering the two substrates each at the recording layer, the adhesive resin layer containing an acrylic monomer, a radical former and an epoxy compound and having a epoxy value of at least 0.005, whereby said adhesive resin layer prevents tellurium contained in said recording layer from being oxidized in a high temperature and high humidity atmosphere.

8. A signal recording disk comprising an aluminum reflection layer formed on a transparent resin substrate having a train of signal bits previously formed thereon, and an adhesive resin layer formed on the reflection layer, the adhesive resin layer containing an acrylic monomer, a radical former, and an epoxy compound and having an epoxy value of at least 0.005, whereby said adhesive resin layer prevents aluminum in said aluminum reflection layer from being oxidized in a high temperature and high humidity atmosphere.

* * * * *